Patented Nov. 4, 1924.

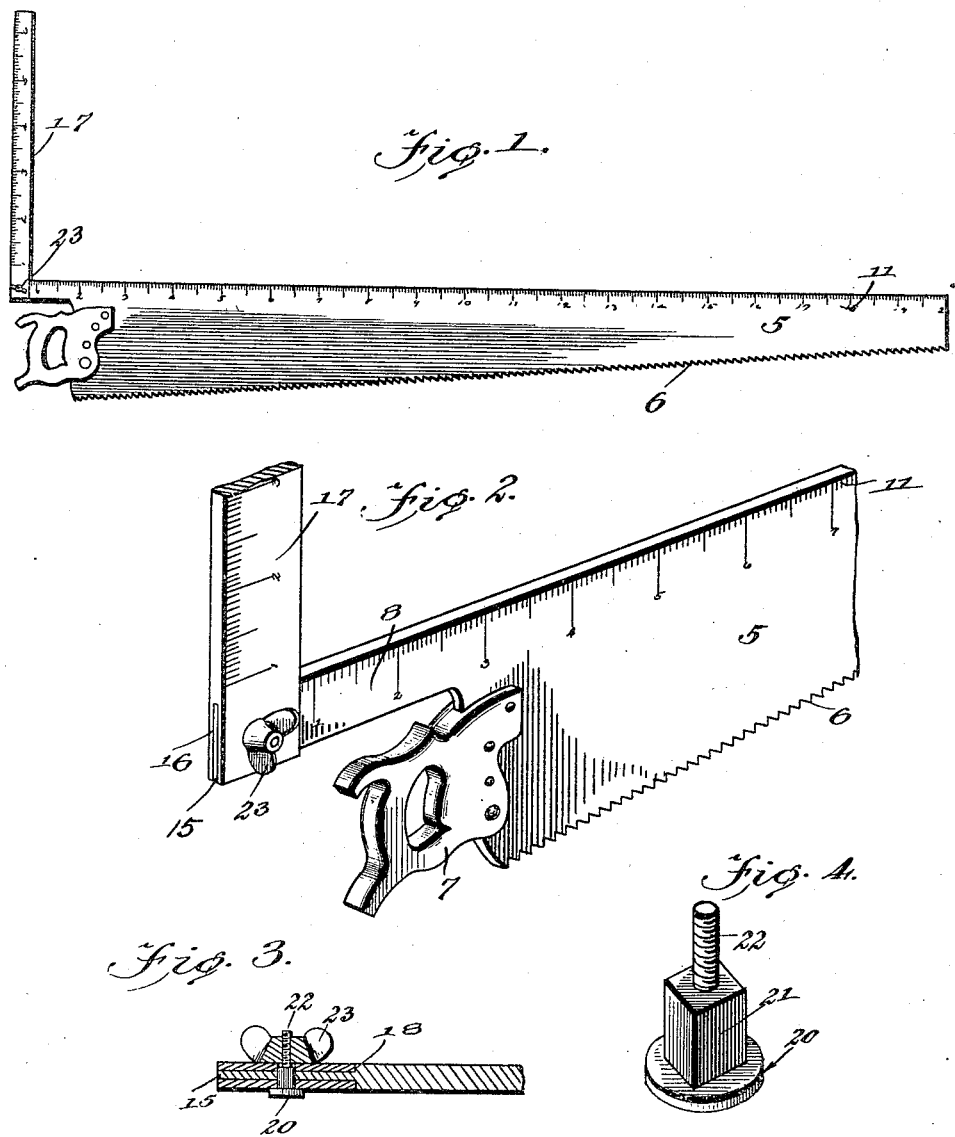

1,514,180

UNITED STATES PATENT OFFICE.

WILLIAM A. SPITLER, OF KANSAS CITY, MISSOURI.

COMBINATION SAW AND SQUARE.

Application filed July 21, 1923. Serial No. 652,952.

*To all whom it may concern:*

Be it known that I, WILLIAM A. SPITLER, a citizen of the United States, and resident of Kansas City, in the county of Jackson and State of Missouri, have invented certain new and useful Improvements in Combination Saws and Squares, of which the following is a specification.

This invention relates to tools, and more particularly to a combined saw and square.

An important object is to provide a saw wherein the rear edge of the same is perfectly straight and is calibrated to represent one branch or side of a square and a second branch detachably connected to the rear end of the saw blade to define a second branch of the square, the second named branch being removable so that the saw may be used without the square feature.

A further and equally important object is to provide a saw wherein the same is provided with a rearwardly projecting guard by means of which the operator's hand is protected and the said guard is calibrated to form a portion of one branch of the square.

A further aim is to provide a combined saw and square which is simple to operate, durable in use, and cheap to manufacture.

Other objects and advantages will be apparent during the course of the following description.

In the accompanying drawing, forming a part of this application and in which like numerals are employed to designate like parts throughout the same, Figure 1 is a side elevation of the improved tool, Fig. 2 is a fragmentary perspective of the same, Fig. 3 is a detail sectional view illustrating the detachable connection between the branches of the square, and Fig. 4 is a perspective of a nut embodied in the invention.

In the drawing wherein for the purpose of illustration is shown a preferred embodiment of the invention, the numeral 5 designates a saw blade, one longitudinal edge of which is provided with the usual teeth 6. The rear end of the blade is provided with a handle 7, and as shown particularly in Fig. 2 the upper edge of the blade is provided with an extension 8 which overhangs the handle and constitutes a guard by means of which the hand engaged with the handle 7 is protected from injury during the use of the saw as such. It is important to note that the guard 8 is arranged in spaced relation to the rear edge of the handle and therefore does not in any way interfere with the operation of the saw or the engagement of one's hand with the handle.

The upper longitudinal edge of the blade 5 is perfectly straight and is calibrated as indicated at 11 to form one side of a square and to constitute a measuring device by means of which various measurements may be made.

The rearwardly projecting extension 8 is formed with a reduced attaching portion 15 as illustrated in Fig. 3, and the said reduced attaching portion is snugly received in a transverse groove 16 in the lower portion of a branch 17 of the square. One longitudinal edge of the branch 17 is flatly engaged with transverse shoulders 18 on the extension 8 so that the branch 17 is maintained exactly at right angles to the saw blade. Furthermore the upper longitudinal edge of the attaching portion 15 is flatly engaged with the inner end wall of the groove 16 so that the said inner end wall cooperates with the shoulders 18 in maintaining the parts 5 and 17 at right angles to each other.

A bolt 20 having a square shank 21 is extended through squared openings in the overlapped portions of the blade 5 and the branch 17, and it is provided with a threaded stem 22 for engagement by a wing-nut 23 or other fastening device. When the wing-nut 23 is securely fastened on the threaded stem 22 the lower portion of the branch 17 is flatly engaged with the rear terminal of the extension 8 so that the parts are securely connected.

In use as a square, the handle 7 forms a convenient means whereby the tool may be applied and adjusted on the work and it will be seen that the guard or extension 8 spaces the hand of the operator from the work.

Furthermore the branch 17 may be readily detached when it is desired to use the saw alone, and it is here noted that the parts may be conveniently packed in a carpenter's tool-box or other carrier.

Fig. 1 plainly illustrates that the handle is arranged in advance of the detachable branch so that the rear or outer edge of the detachable branch may be engaged with the work.

In carrying out the invention the branch 17 is provided along one edge with calibrations as illustrated in Figs. 1 and 2.

Having thus described the invention, what is claimed is:—

The combination of a branch having its rear end provided with an extension having a reduced portion defining shoulders, a handle connected to said branch beneath said extension and in spaced relation thereto, said extension terminating rearwardly of said handle and constituting a guard for protecting the operator's hand engaged with the handle, a second branch having a transverse groove receiving the reduced portion of said extension, means detachably connecting the adjacent portions of said first and second-named branches, said shoulders being flatly engaged with the adjacent edge of one of the branches and the upper edge of said reduced extension being flatly engaged with the inner end wall of said groove, whereby to hold the branches at right angles to each other, said branches having their edges formed with calibrations.

WILLIAM A. SPITLER.